(12) United States Patent
Crawley

(10) Patent No.: US 7,560,825 B2
(45) Date of Patent: Jul. 14, 2009

(54) NETWORK DEVICES FOR SEPARATING POWER AND DATA SIGNALS

(75) Inventor: Philip John Crawley, Folsom, CA (US)

(73) Assignee: Akros Silicon, Inc., Folsom, CA (US)

( * ) Notice: Subject to any disclaimer, the term of this patent is extended or adjusted under 35 U.S.C. 154(b) by 336 days.

(21) Appl. No.: 11/279,322

(22) Filed: Apr. 11, 2006

(65) Prior Publication Data

US 2007/0236853 A1    Oct. 11, 2007

(51) Int. Cl.
*G06F 1/26* (2006.01)

(52) U.S. Cl. .......................................... 307/1; 713/300

(58) Field of Classification Search ............. 307/110.11
See application file for complete search history.

(56) References Cited

U.S. PATENT DOCUMENTS

| | | | |
|---|---|---|---|
| 6,640,308 B1 * | 10/2003 | Keyghobad et al. ......... | 713/300 |
| 7,148,659 B2 * | 12/2006 | Lanni ......................... | 363/142 |
| 7,203,851 B1 * | 4/2007 | Lo et al. ...................... | 713/310 |
| 7,299,368 B2 * | 11/2007 | Peker et al. .................. | 713/300 |
| 7,355,416 B1 * | 4/2008 | Darshan ...................... | 324/713 |
| 7,363,525 B2 * | 4/2008 | Biederman et al. .......... | 713/340 |
| 2004/0239465 A1 * | 12/2004 | Chen et al. ................... | 336/173 |
| 2006/0119478 A1 * | 6/2006 | Karam et al. ................ | 340/538 |
| 2006/0238252 A1 * | 10/2006 | Crawley et al. .............. | 330/253 |

* cited by examiner

*Primary Examiner*—Stephen W Jackson
*Assistant Examiner*—Adi Amrany
(74) *Attorney, Agent, or Firm*—Koestner Bertani LLP; Mary Jo Bertani

(57) ABSTRACT

Embodiments disclosed herein provide a network device comprises a transformer with a primary winding and a secondary winding. The primary winding is coupled to receive input signals from a network connector and supply data signals to a physical layer (PHY) module. An inductance boost circuit is coupled to the secondary winding and operable to increase the impedance of the primary winding. In other embodiments, a network device comprises an autotransformer coupled to receive input signals from a network connector and supply data signals to a physical layer (PHY) module. An electronic load coupled in parallel between the autotransformer and the PHY layer module.

25 Claims, 6 Drawing Sheets

NETWORK DEVICES FOR SEPARATING POWER AND DATA SIGNALS

CROSS REFERENCE TO RELATED APPLICATIONS

This application claims the benefit of priority to and incorporates herein by reference in its entirety for all purposes, U.S. Provisional Patent Application No. 60/665,766 entitled "SYSTEMS AND METHODS OPERABLE TO ALLOW LOOP POWERING OF NETWORKED DEVICES," by John R. Camagna, et al. filed on Mar. 28, 2005. This application is related to and incorporates herein by reference in its entirety for all purposes, U.S. patent application Ser. Nos. 11/207,595 entitled "METHOD FOR HIGH VOLTAGE POWER FEED ON DIFFERENTIAL CABLE PAIRS," by John R. Camagna, et al. filed Aug. 19, 2005; and 11/207,602 entitled "A METHOD FOR DYNAMIC INSERTION LOSS CONTROL FOR 10/100/1000 MHZ ETHERNET SIGNALLING," by John R. Camagna, et al., which have been filed concurrently filed Aug. 19, 2005.

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VoIP) telephones and other devices, are increasingly deployed and consume power. When compared to traditional counterparts, network appliances use an additional power feed. One drawback of VoIP telephony is that in the event of a power failure the ability to contact emergency services via an independently powered telephone is removed. The ability to distribute power to network appliances or circuits enable network appliances such as a VoIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, which are incorporated herein by reference. However, power distribution schemes within a network environment typically employ cumbersome, real estate intensive, magnetic transformers. Additionally, power over Ethernet (PoE) specifications under the IEEE 802.3 standard are stringent and often limit allowable power.

Many limitations are associated with use of magnetic transformers. Transformer core saturation can limit current that can be sent to a power device, possibly further limiting communication channel performance. Cost and board space associated with the transformer comprise approximately 10 percent of printed circuit board (PCB) space within a modern switch. Additionally, failures associated with transformers often account for a significant number of field returns. Magnetic fields associated with the transformers can result in lower electromagnetic interference (EMI) performance.

However, magnetic transformers also perform several important functions such as supplying DC isolation and signal transfer in network systems. Thus, an improved approach to distributing power in a network environment may be sought that addresses limitations imposed by magnetic transformers while maintaining transformer benefits.

SUMMARY

In some embodiments, a network device comprises a transformer with a primary winding and a secondary winding. The primary winding is coupled to receive input signals from a network connector and supply data signals to a physical layer (PHY) module. An inductance boost circuit is coupled to the secondary winding and operable to increase the impedance of the primary winding.

In other embodiments, a network device comprises an autotransformer coupled to receive input signals from a network connector and supply data signals to a physical layer (PHY) module. An electronic load coupled in parallel between the autotransformer and the PHY layer module.

In further embodiments, methods are disclosed that include coupling an inductance boost circuit coupled to a secondary winding of a transformer. The primary winding of the transformer receives input signals from a network connector and supplies data signals to a physical layer (PHY) module. The inductance boost circuit is configured to stop functioning during an over-voltage event due to high currents saturation of the transformer.

BRIEF DESCRIPTION OF THE DRAWINGS

Embodiments of the invention relating to both structure and method of operation may best be understood by referring to the following description and accompanying drawings.

DETAILED DESCRIPTION

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

In various embodiments, an active inductance boost transformer reduces the size of the transformer required to separate power signals from data signals. It is expected that the boost transformer will have at least 10×-100× less volume than a conventional transformer. The active boost transformer increases the impedance for data signals, and acts as a short circuit during over-voltage and over-current events. As a result, the surge current will flow through the protection circuit, thereby preventing damage to connected devices.

Furthermore, conventional transformers create insertion loss and return loss as well as limit high frequency performance. Replacing a conventional transformer with a boost transformer (or an autotransformer) removes a major source of data signal degradation and helps enable high speed operation, for example, Gigabit and 10 Gigabit operation.

Figure 1A:
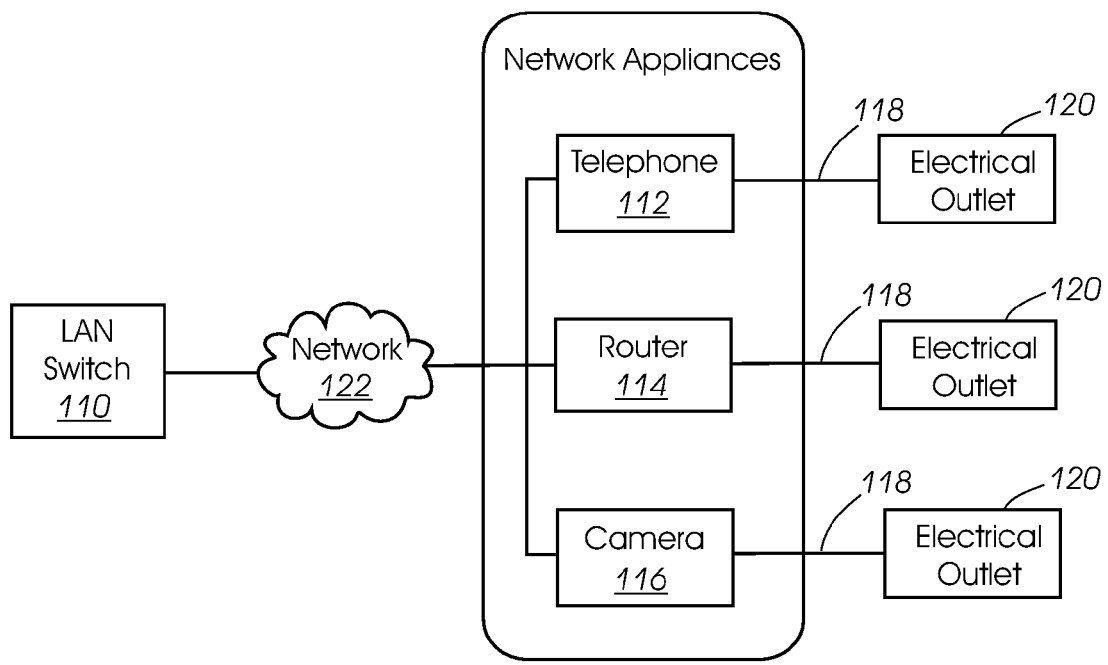
FIGS. 1A and 1B show embodiments of client devices in which power is supplied separately to network attached client devices, and a power-over Ethernet (PoE) enabled LAN switch that supplies both data and power signals to the client devices.
Figure 1B:
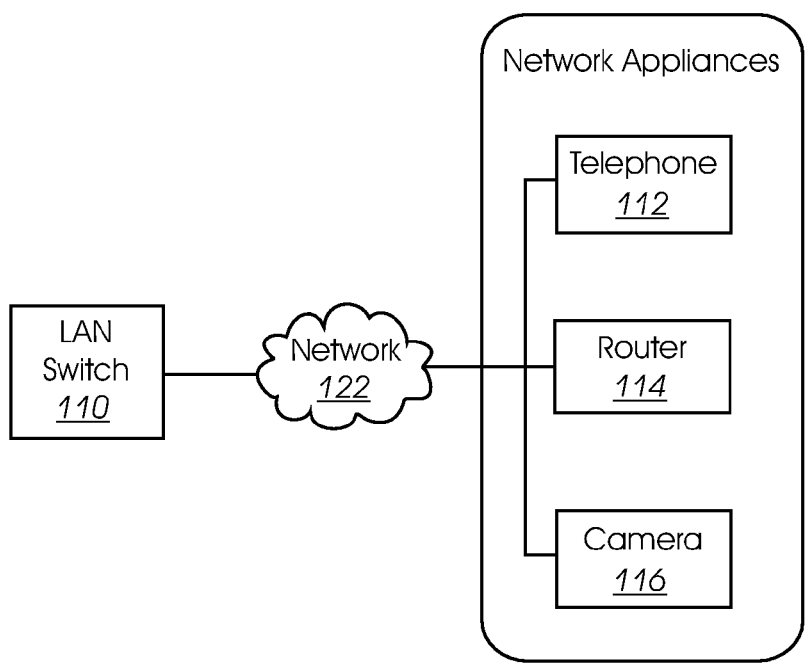

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard, such as HDSL (High bit-rate Digital Subscriber Line), T1/E1, cable modem, and other suitable technologies.

Typical conventional communication systems use transformers to perform common mode signal blocking, 1500 volt isolation, and AC coupling of a differential signature as well as residual lightning or electromagnetic shock protection. The functions are replaced by a solid state or other similar circuits in accordance with embodiments of circuits and systems described herein whereby the circuit may couple directly to the line and provide high differential impedance and low common mode impedance. High differential impedance enables separation of the physical layer (PHY) signal from the power signal. Low common mode impedance enables elimination of a choke, allowing power to be tapped from the line. The local ground plane may float to eliminate a requirement for 1500 volt isolation. Additionally, through a combination of circuit techniques and lightning protection circuit, voltage spike or lightning protection can be supplied to the network attached device, eliminating another function performed by transformers in traditional systems or arrangements. The disclosed technology may be applied anywhere transformers are used and is not limited to Ethernet applications.

Specific embodiments of the circuits and systems disclosed herein may be applied to various powered network attached devices or Ethernet network appliances. Such appliances include, but are not limited to VoIP telephones, routers, printers, and other suitable devices.

In an Ethernet application, the IEEE 802.3af standard (PoE standard) enables delivery of power over Ethernet cables to remotely power devices. The portion of the connection that receives the power may be referred to as the powered device (PD). The side of the link that supplies power is called the power sourcing equipment (PSE).

Figure 2:
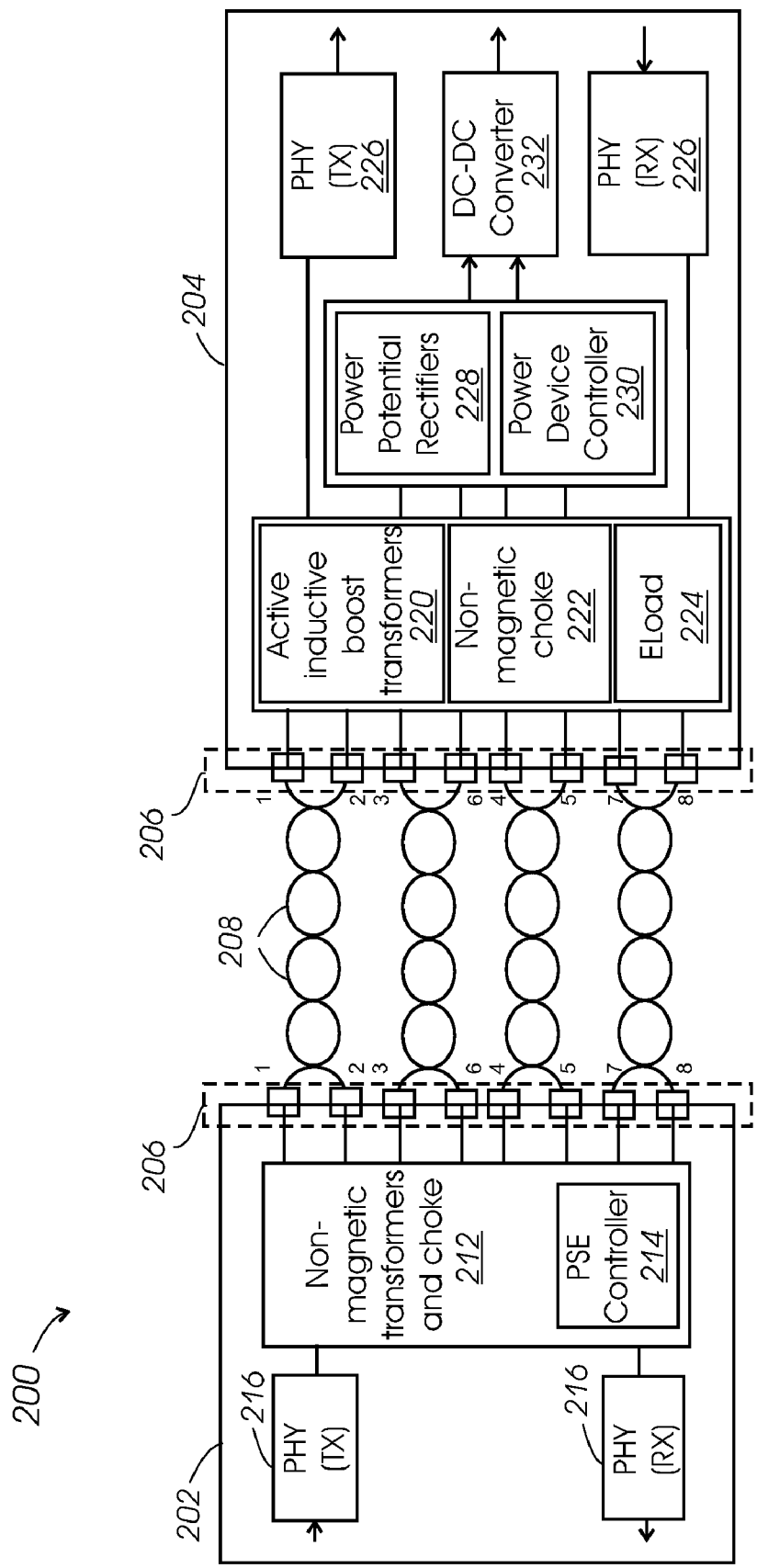
FIG. 2 shows an embodiment of a network interface device including a network powered device (PD) interface and a network power supply equipment (PSE) interface, each implementing a non-magnetic transformer and choke circuit.

Referring to FIG. 2, a functional block diagram depicts an embodiment of a network device 200 including power source equipment (PSE) interface 202 coupled to powered device (PD) interface 204 via respective network connectors 206 and multiple twisted pair conductors 208 between connectors 206. Twisted pair conductors 208 can be, for example, twisted 22-26 gauge wire and connectors 206 can be RJ-45 connectors. Other suitable conductors and connectors can be used.

In the embodiment shown, PSE interface 202 includes non-magnetic transformers and choke circuit 212 and power source equipment (PSE) controller 214 coupled between physical layer (PHY) layer module 216 and connector 206. Non-magnetic transformer and choke circuit 212 are implemented in integrated circuitry and replace the functionality of a magnetic transformer. Eliminating magnetic transformers with integrated system solutions enable an increase in component density by replacing magnetic transformers with solid state power feed circuit in the form of an integrated circuit or discreet component.

PD interface 204 can include active inductance boost transformers 220, non-magnetic choke circuit 222, and electronic load (eload) circuit 224 coupled between another connector 206 and PHY layer module 226. Power potential rectifiers 228 and power device controller 230 can be coupled between connector 206 and DC-DC converter 232.

Power potential rectifiers 228 rectify and pass a received power signal to ensure proper signal polarity is applied to DC-DC converter 230. The network device 200 is shown sourcing power through lines 3, 4, 5, and 6 of the network connectors 206, however, other lines can be used. Power potential rectifiers 228 may be a diode bridge or other rectifying component or device. The circuits may be discrete components or an integrated circuit. Any one of a subset of the twisted pair conductors 208 can forward bias to deliver current, and the power potential rectifiers 228 can forward bias a return current path via a remaining conductor of the subset.

Power device controller 230 may be used to control power supply to network attached devices. The power signals are supplied by power potential rectifiers 228 to converter 232. Typically the power signal received does not exceed 57 volts SELV (Safety Extra Low Voltage). Typical voltage in an Ethernet application is 48-volt power. Converter 232 may then further transform the power to provide 1.8 to 12 volts, or other voltages specified by many Ethernet network attached devices, such as wireless access point circuitry or IP telephony circuitry.

If the PD interface 204 is used in an Ethernet network, may support the 10/100/1000 Mbps data rate and other future data networks such as a 10000 Mbps Ethernet network as well as other Ethernet data protocols that may arise. An Ethernet PHY layer module 226 may additionally couple to an Ethernet media access controller (MAC) (not shown). The PHY layer module 226 and Ethernet MAC when coupled can implement the hardware layers of an Ethernet protocol stack. The architecture may also be applied to other networks and protocols. If a power signal is not received but a traditional, non-power Ethernet signal is received at connector 206, the PD interface 204 still passes the data signal to the PHY layer module 226.

PSE interface 202 and PD interface 204 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive and aircraft networks for the distribution of power and data to various monitoring circuits or for the distribution and powering of entertainment devices, such as entertainment systems, video and audio entertainment systems often found in today's transportation. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a HomePNA local area network and other similar networks. HomePNA uses existing telephone wires to share a single network connection within a home or building. Alternatively, embodiments may be applied where network data signals are provided over power lines.

In some embodiments, non-magnetic transformer and choke circuit 212, PHY layer modules 216, 226, PSE controller 214, non-magnetic choke circuit 222, rectifiers 228, PD controller 230, and converter 232 may be implemented in integrated circuits rather than discrete components at the printed circuit board level. The circuits may be implemented in any appropriate process, for example, power components may be implemented using a high voltage silicon on insulator process whereas other components can be implemented using a 0.18 or 0.13 micron process or any suitable size process.

Network device 200 may implement functions including IEEE 802.af signaling and load compliance, local unregulated supply generation with over current protection, and signal transfer between the lines 208 and integrated Ethernet PHY layer modules 216, 226. Since devices are directly connected to the line 208, the device 200 may be implemented to withstand a secondary voltage surge.

Non-magnetic transformer and choke circuit 212 may take the form of a single or multiple port switch to supply power to single or multiple devices attached to the network. Power sourcing equipment interface 202 may be operable to receive power and data signals and combine to communicate power signals which are then distributed via an attached network. If power sourcing equipment interface 202 is included in a gateway or router computer, a high-speed uplink couples to a network such as an Ethernet network or other network. The data signal is relayed via network PHY 216 and supplied to non-magnetic transformer and choke circuit 212. Power sourcing equipment interface 202 may be attached to an AC power supply or other internal or external power supply to supply a power signal to be distributed to network-attached devices that couple to power sourcing equipment interface 206.

Power sourcing equipment (PSE) controller circuit 214 within or coupled to non-magnetic transformer and choke circuit 212 may determine, in accordance with IEEE standard 802.3af or other suitable standard, whether a network-attached device in the case of an Ethernet network-attached device is a device operable to receive power from power supply equipment. When determined that an IEEE 802.3af compliant powered device (PD) is attached to the network, PSE controller circuit 214 may supply power from power supply to non-magnetic transformer and choke circuit 212, which is sent to the downstream network-attached device through network connectors 206, which in the case of the Ethernet network may be an RJ45 receptacle and cable.

IEEE 802.3af Standard is to fully comply with existing non-line powered Ethernet network systems. Accordingly, PSE detects via a well-defined procedure whether the far end is PoE compliant and classify sufficient power prior to applying power to the system. Maximum allowed voltage is 57 volts for compliance with SELV (Safety Extra Low Voltage) limits.

For backward compatibility with non-powered systems, applied DC voltage begins at a very low voltage and only begins to deliver power after confirmation that a PoE device is present. In the classification phase, the PSE applies a voltage between 14.5V and 20.5V, measures the current and determines the power class of the device. In some embodiments, the current signature is applied for voltages above 12.5V and below 23 Volts. Current signature range is 0-44 mA.

A maintain power signature can be applied in the PoE signature block—a minimum of 10 mA and a maximum of 23.5 kilo-ohms may be applied for the PSE interface 202 to continue to feed power. The maximum current allowed is limited by the power class of the device (class 0-3 are defined). For class 0, 12.95 Watts is the maximum power dissipation allowed and 400 milliamperes is the maximum peak current. Once activated, the PoE will shut down if the applied voltage falls below 30V and disconnect from the line 208.

Power source devices in normal power mode provide a differential open circuit at the Ethernet signal frequencies and a differential short at lower frequencies. The common mode circuit presents the capacitive and power management load at frequencies determined by PSE controller circuit 214.

Figure 3A:
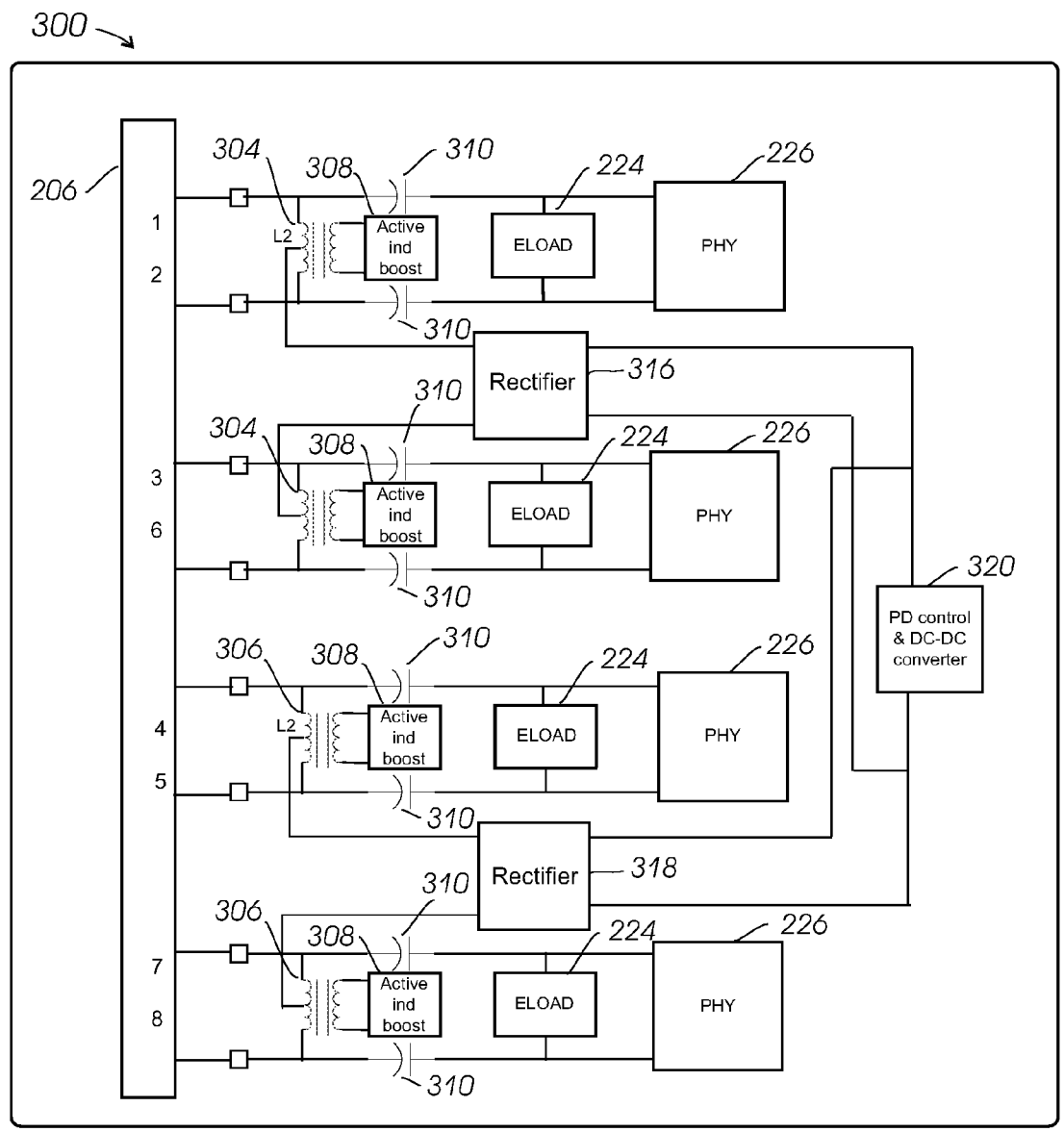
FIG. 3A is a diagram of an example of a configuration for a network interface device that includes active boosting circuits for a magnetic transformer and diode bridges to rectify power signals received from the transformers.

Referring to FIG. 3A, a schematic circuit diagram of an embodiment of powered device (PD) interface 300 is shown that is suitable for use as PD interface 202 in FIG. 2. PD interface 300 includes connector 206 coupled to active inductance boost transformers 304, 306 that include primary and secondary windings. Transformers 304 are connected across line pairs 1 and 2, and 3 and 6. Transformers 306 are connected across line pairs 4 and 5, and 7 and 8. Active inductance boost circuits 308 are coupled to respective secondary windings of transformers 304, 306. Capacitors 310 are coupled between transformers 304, 306 and PHY layer modules 226. Electronic loads (ELOAD) 224 are coupled in parallel between respective transformers 304, 306 and PHY layer modules 226.

The purpose of using either an autotransformer or a traditional transformer is to provide high impedance at as low a frequency as possible to avoid affecting the data signal. High impedance can be achieved with large inductance, which is physically large and costly. Active inductance boost circuits 308 reduce the size of the inductance needed. During an over-voltage event, active boost circuits 308 will not function because the high currents will saturate the core of the transformer. Because the inductance is much smaller than in a traditional transformer, the inductor quickly shorts out and provides an excellent current discharge path. This would also happen in a traditional transformer, but because the inductance is so much smaller the voltage excursion during the over-voltage event, which could affect the PHY devices, is also much smaller.

Figure 3B:
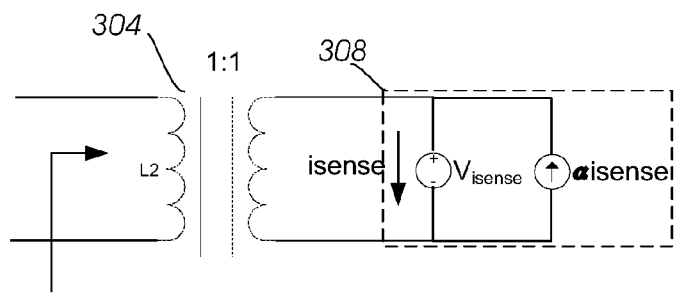
FIG. 3B is a diagram of an embodiment of an active inductance boost circuit.

FIG. 3B shows an embodiment of active inductance boost circuit 308 coupled to the secondary winding of transformer 304 that can be used in PD interface 300 to reduce the size of the transformer component and avoid other problems associated with other types of transformers. Boost circuit 308 typically includes an active circuit (not shown) that senses the current from transformer 304 and feeds back a proportional amount of current. Primary and secondary windings of transformer 308 typically have a 1:1 ratio. A feedback gain factor (α) is applied to the sensed current ($i_{sense}$) to increase the impedance (z) on the primary side of transformer 304. The increase in impedance on the primary side of transformer 304 is (1/(1−α)), where α is typically close to, but less than one (1). The impedance ($Z_{in}$) on the primary side of transformer 304 is given by:

$$Z_{in}=sL_2/(1-\alpha)$$

where:
s=frequency of the input signal,
$L_2$=the inductance of the primary winding, and
α=feedback gain factor.

Note that active inductance boost circuit 308 reduces the requirement for surge protection compared to an autotransformer or traditional transformer due to the fact that the required inductance is achieved with boost transformer 308 rather than a larger transformer. Note that smaller transformers 304, 306 will saturate at a much lower current. Thus, in an over-voltage event, capacitors (not shown) in PD controller 320 effectively short out the lines to chassis (or earth) ground and limit the energy provided to PHY layer module 226. In some embodiments, over-voltage protection circuitry can be included with rectifier circuit 316 in addition to, or instead of, using capacitors in PD controller 320.

Figure 3C:
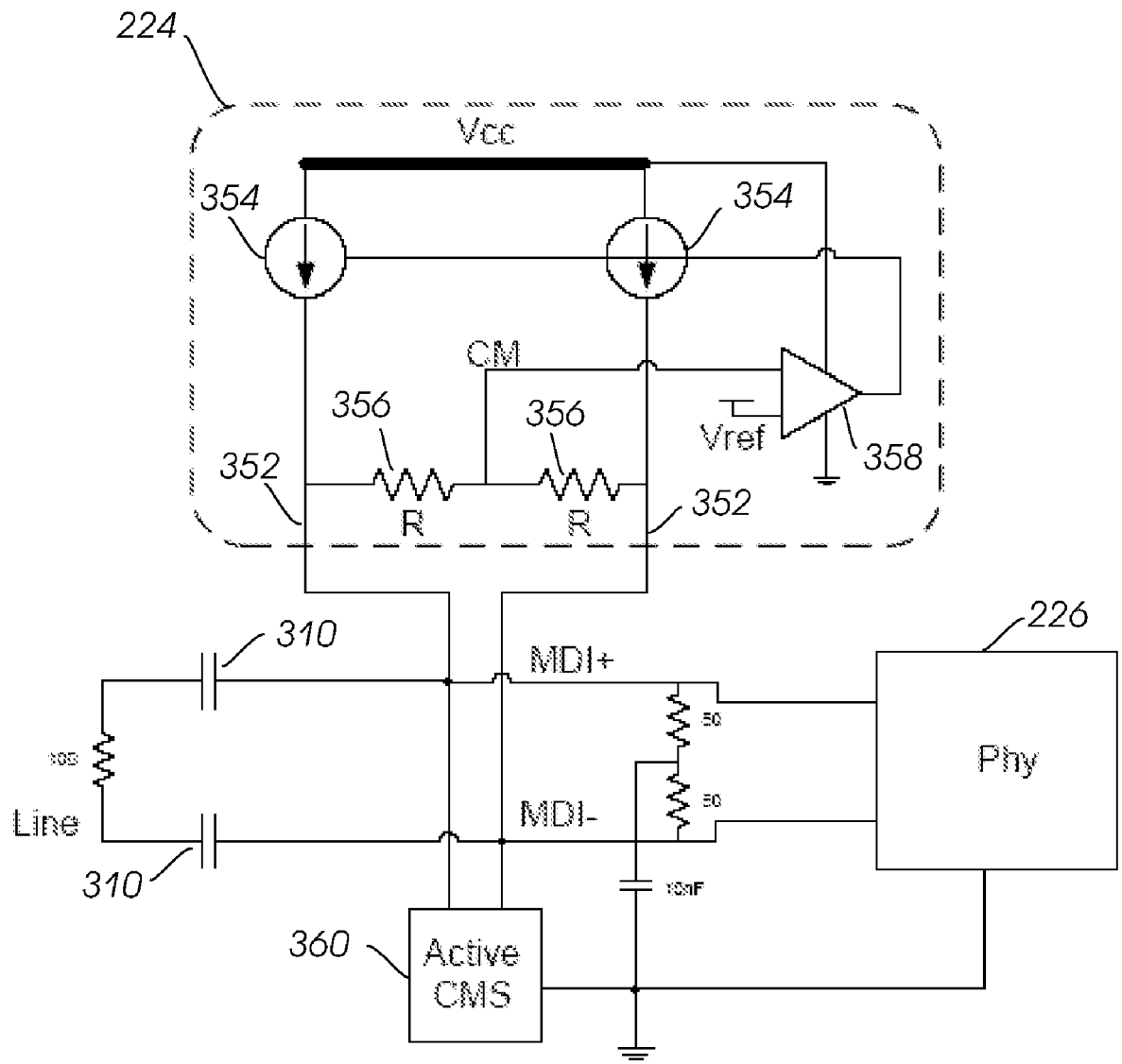
FIG. 3C is a diagram of an embodiment of an electronic load circuit.

Eload circuit 224 provides provide common-mode output voltage control and a current source to the PHY layer module 226. FIG. 3C shows an embodiment of eload circuit 224 that includes leads 352 coupled to respective positive and negative medium dependent interface (MDI) input signals to PHY layer module 226. Voltage source Vcc is coupled between leads 352, and current sources 354 are coupled inline with leads 352 between voltage source Vcc and MDI input signals to PHY layer module 226. Sense resistors 356 are coupled in series between positive and negative leads 352. Common mode (CM) lead is coupled between first and second sense resistors 356, and differential amplifier 358. A reference voltage is supplied to another input of differential amplifier 358 and a signal representing the difference between the CM input signal and the reference voltage signal is output by differential amplifier 358 and supplied to current sources 354.

The embodiment shown also includes an active common mode suppression (CMS) circuit 360 coupled to respective positive and negative MDI input signals to PHY layer module 226. CMS circuit 360 includes an inductor that blocks alternating current while passing direct current to PHY layer module 226.

Eload circuit 224 can sense and supply the current required by PHY layer module 226 and active CMS circuit 360. The common mode voltage level is controlled by active feedback to current supplies 354 through differential amplifier 358, thereby providing a high differential mode impedance in the frequency band of interest for the signals to PHY layer module 226. Additionally, eload circuit 224, active CMS circuit 360, and PHY layer module 226 can be integrated in the same integrated circuit process technology, thereby reducing fabrication cost and complexity.

Referring again to FIG. 3A, rectifier circuits 316, 318 receive input signals from center taps of transformers 304, 306. A first rectifier circuit 316 receives input power and data signals from the center taps of the transformers 304 connected across lines 1 and 2, and across lines 3 and 6 of the network connector 306. A second rectifier circuit 318 receives input power and data signals from the center taps of the transformers 306 connected across lines 4 and 5, and across lines 7 and 8 of the network connector 302. For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to PD controller and DC-DC converter circuits 320.

The illustrative PD interface 300 may be implemented as part of a powered device (PD) that receives power sourced by power sourcing equipment (PSE), for example, on line pairs 1 and 2, and 3 and 6 on the network connector 302. Each rectifier circuit 316, 318 has connections to respective transformers 304, 306. One of the two connections is at supply potential, for example VDD, and one is at ground potential. Power is applied to the two input terminals of rectifier circuits 316, 318 at a high potential and a low potential but the potential applied to a particular input terminal is not important. Rectifier circuits 316, 318 rectify the power signal so that no matter how power is connected, one output line is always at the VDD supply potential (VDD OUT) and another output line is at ground potential (GND OUT). Examples of rectifier circuits 316, 318 that can be used include diode bridge rectifier circuits or MOSFET bridge rectifier circuits, among others.

Figure 4:
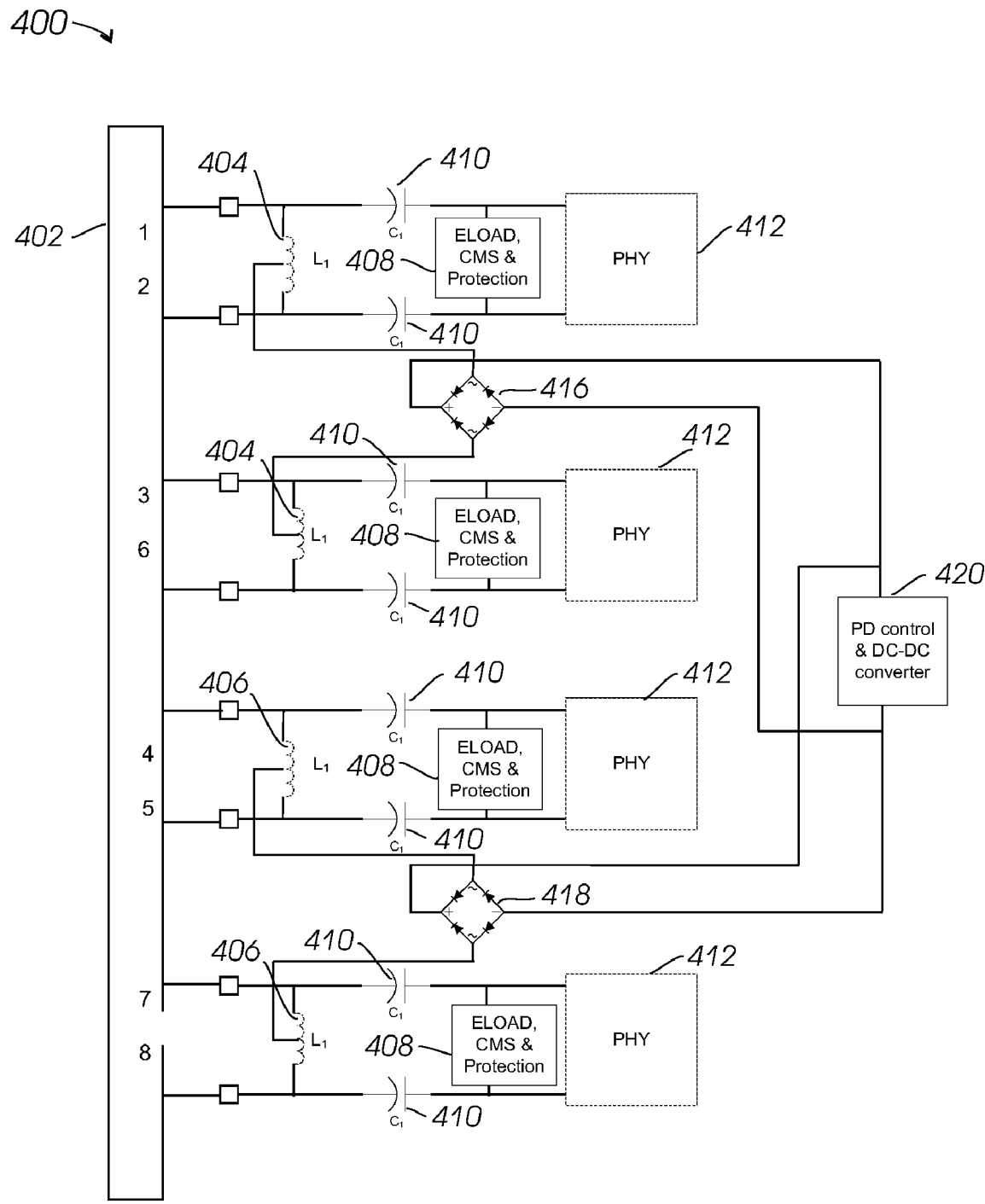
FIG. 4 is a diagram of another embodiment of a configuration for a network interface device that includes autotransformers and diode bridges to rectify power signals received from the transformers.

Referring to FIG. 4, another embodiment of a powered device (PD) interface 204 is shown that is suitable for use as PD interface 204 in FIG. 2. PD interface 400 includes connector 402 coupled to autotransformers 404, 406. Autotransformers 404, 406 are electrical transformers with only one winding. The winding has at least three electrical connection points called taps. The voltage source is applied to two taps and an electronic load 408 is connected to two taps, one of which is usually a common connection that is also connected to the source. A portion of the same winding effectively acts as part of both the primary and secondary winding. Transformers 404 are connected across line pairs 1 and 2, and 3 and 6 of connector 402. Transformers 406 are connected across line pairs 4 and 5, and 7 and 8 of connector 402. Capacitors 410 can be coupled to the leads between transformers 404, 406 and PHY layer modules 412. Electronic loads 408 are coupled in parallel to leads between capacitors 410 and PHY layer modules 412.

Common mode suppression (CMS) circuits and surge protection circuits can be included between transformers 404, 406 and PHY layer modules 412.

rectifier circuits 416, 418 may be a diode bridge or other rectifying component or device. A bridge or rectifier may couple to individual conductive lines 1-8. For example, FIG. 4 shows rectifier circuits 416, 418 receiving input signals from the center taps of the transformers 404, 406. A first rectifier circuit 416 receives input power signals from the center taps of the transformers 404 connected across lines 1 and 2, and connected across lines 3 and 6 of the network connector 402. A second conditioning circuit 418 receives input power signals from the center taps of the transformers 406 connected across lines 4 and 5, and connected across lines 7 and 8 of the network connector 402.

The illustrative PD interface 400 may be implemented as part of a powered device (PD) that receives power sourced by power sourcing equipment (PSE), for example, on line pairs 1 and 2, and 3 and 6 on the network connector 402. Each conditioning circuit 416, 418 has two connections to center taps of two respective transformers 404, 406. One of the two connections is at supply potential, for example VDD, and one is at ground potential. Power is applied to the two input terminals of the conditioning circuit 416, 418 at a high potential and a low potential but the potential applied to a particular input terminal is not known. Thus, the conditioning circuit 416, 418 rectifies the power signal so that no matter how power is connected, one output line is always at the VDD supply potential (VDD OUT) and another output line is at ground potential (GND OUT). A disadvantage of using a diode bridge in conditioning circuits 416, 418 is lossy rectification performance. Accordingly, rectifier circuits 416, 418 can be implemented with a transistor bridge, for example, with metal oxide semiconductor field effect transistors (MOSFETs) replacing the diodes shown in rectifier circuits 416, 418.

Figure 5:
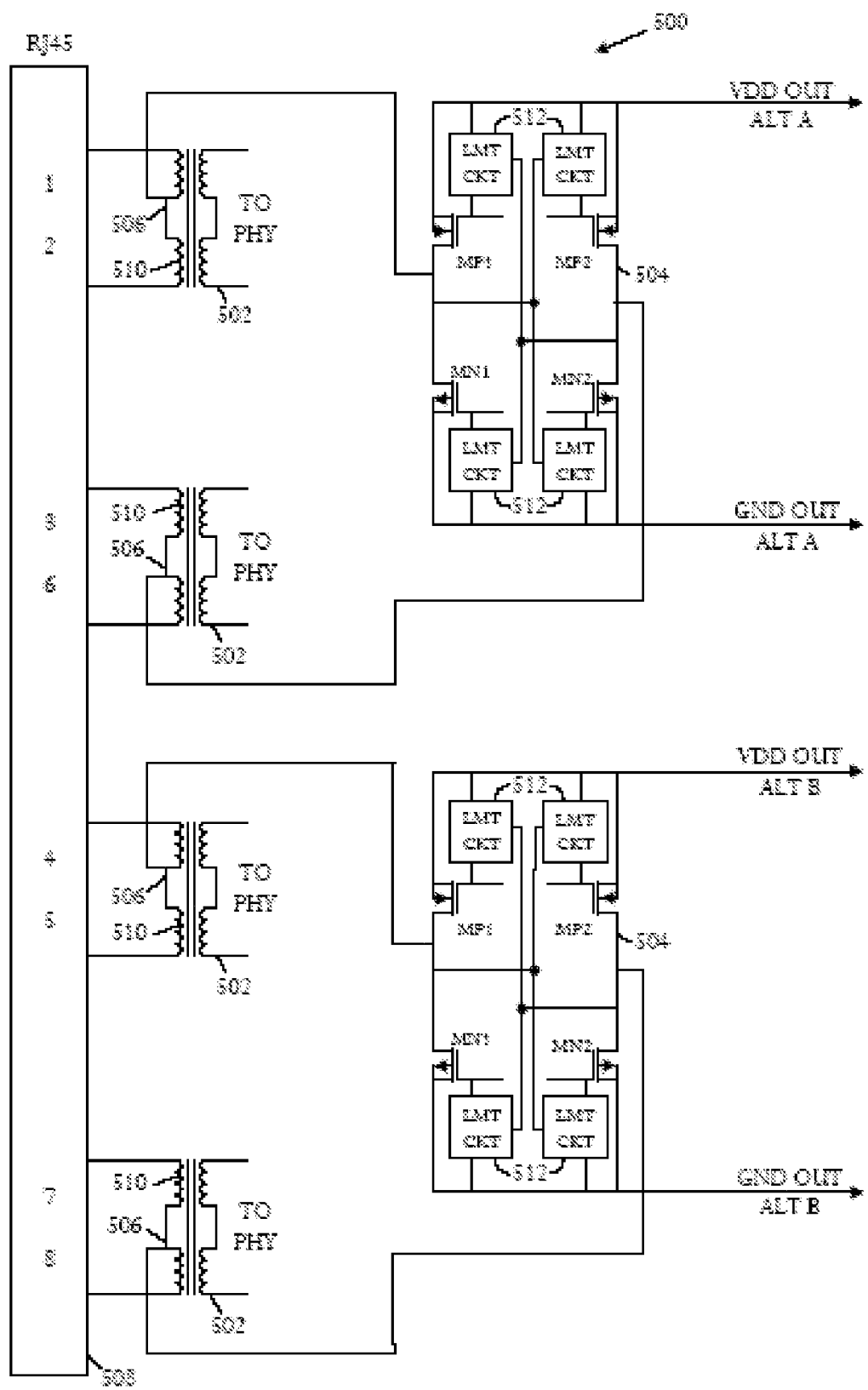
FIG. 5 is a functional circuit diagram showing an embodiment of a network device that includes transformers and rectifying circuits whereby power is delivered via the center taps of the transformers.

Referring to FIG. 5, functional circuit diagrams illustrate embodiments of network device 500 that includes transformers 502 whereby power is delivered via the center taps 506 of the transformers 502. The transformer center taps 506 separates the power signal from the data signal.

In addition to a power potential rectifier circuit 504 that rectifies and passes a power signal and data signal received from a network connector 508, the network device 500 further comprises one or more transformers 502 coupled across line pairs of the network connector 508. The transformers 502 include a coil 510 and a center tap 506 coupled to the coil 510. The center tap 506 is configured to separate the power signal from the data signal. Power potential rectifier circuits 504 are coupled to the transformer center taps 506 and configured to regulate the power signal. In an illustrative embodiment, the power potential rectifier circuits 504 may be a MOSFET bridge.

Power signals accessed from the transformer center taps 506 cross-couple the input line pairs to ensure that one line pair is high and one line pair is low at any time. For example, in the illustrative structure if line pairs 1 and 2 are high, then line pairs 3 and 6 are low. Accordingly, the center tap voltage of lines 1 and 2 is used to control the NMOS transistor in the connected MOSFET rectifier circuits 504 to control the other lines or route power to the other lines to ground. Thus, if the same potential is tied to the PMOS transistor, which extends to the VDD OUT signal line, then the PMOS transistors are in an off state because lines 1 and 2 are high and the voltage at the center tap 506 of the transformer 502 controls the rectifier circuits 504 so that PMOS transistors are turned on, routing power to VDD OUT, and NMOS transistors are turned off.

Although FIG. 5 shows network device 500 with MOSFET rectifier circuits 504 in combination with transformers 502, other embodiments may employ rectifiers constructed from other transistor types such as junction field effect transistors (JFETs), bipolar transistors, and others.

The MOSFET rectifier circuits 504 can route power in configurations that include transformers as shown in FIG. 5, and in configurations that omit the transformers depicted in FIG. 4.

FIG. 5 illustrates a technique for supplying power over a communication interface such as an Ethernet interface wherein power is supplied from the center tap 506 of a transformer 502. Center tapping of the transformer coil 510 enables power to be separated from the Ethernet signal. Power lines connected to the center taps of the transformers are connected to a rectifier bridge circuit 504, illustrated as a MOSFET bridge, but which can be implemented in other forms such as junction field effect transistor (JFET), bipolar transistors, other switching devices, diode bridges, and others. The rectifier circuit 504 rectifies the power signal. In the illustrative embodiment, an RJ45 interface has eight lines with paired lines 1 and 2, 3 and 6, 4 and 5, and 7 and 8 respectively connected to two bridges or four bridges. Each bridge has two input lines, each supplied from the center tap of a transformer, and two output lines including a VDD supply out and a ground output. Input lines to the bridges are connected to the transformer center-tap rather than direct connections to the interface lines because direct connections can result in degradation to the Ethernet data signals. Bridge rectifier functional performance is determined by a capability to rectify the power signal and pass the Ethernet signal with a reduced or minimized degradation.

Limiter circuits 512 can be included to ensure operation within process limits.

Embodiments disclosed herein provide improved network interface devices by reducing the size of the transformer required to separate the power from the data signal. In some implementations, it is expected that transformers 304, 306 (FIG. 3A) will require 10 to 100 times less volume. Also, while the active boost circuit 308 increases the impedance for the data signal, boost circuit 308 and capacitors in PD controller 320 protect devices coupled to PHY layer module 226 from over-voltage and over-current protection, such as defined by IEC61000-4-2/4/5, allowing the surge current to flow through a board ground path. By removing the traditional transformer, embodiments disclosed herein remove one of the major degrading circuits in the data signal path. The transformer creates insertion loss and return loss as well as limiting the high frequency performance. With the active boost approach, a transformer is no longer in the data signal path. Such features will help enable high speed data transfer in PoE networks, for example, Gigabit and 10 Gbit operation.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network device comprising:
   a transformer with a primary winding and a secondary winding, wherein the primary winding is coupled to receive input signals from a network connector and supply data signals to a physical layer (PHY) module;
   an inductance boost circuit coupled to the secondary winding and operable to increase the impedance of the primary winding; and
   the inductance boost circuit senses the current through the secondary winding and applies a gain factor to increase the impedance at the primary winding.

2. The network device according to claim 1 further comprising:
   a first capacitor coupled between a first lead of the transformer and the PHY module; and
   a second capacitor coupled between a second lead of the transformer and the PHY module.

3. The network device according to claim 1 further comprising:
   an electronic load circuit coupled in parallel between the transformer and the PHY layer module.

4. The network device according to claim 3 wherein:
   the electronic load circuit is operable to provide common-mode output voltage control and a current source to the PHY layer module.

5. The network device according to claim 1 wherein:
   the impedance at the primary winding is directly proportional to the frequency of the input signal, the inductance of the primary winding, and inversely proportional to the factor $(1-\alpha)$.

6. The network device according to claim 1 further comprising:
   a rectifying circuit adapted to conductively couple a network connector to an integrated circuit that rectifies and passes a power signal received from the network connector.

7. The network device according to claim 6 wherein:
   the rectifying circuit regulates a received power and/or data signal to ensure proper signal polarity is applied to the integrated circuit.

8. The network device according to claim 6 wherein:
   the network connector receives a plurality of twisted pair conductors; and
   any one of a subset of the twisted pair conductors can forward bias to deliver current and the conditioning circuit can forward bias a return current path via remaining conductors of the subset.

9. The network device according to claim 6 wherein the rectifying circuit includes a diode bridge.

10. The network device according to claim 6 wherein the rectifying circuit includes a transistor bridge integrated onto the integrated circuit.

11. The network device according to claim 10 wherein:
    the transistor bridge transistors are selected from a group consisting of metal oxide semiconductor (MOS) transistors, bipolar junction transistors (BJT), junction field effect transistors (JFET), switchable devices, and impedance control devices.

12. The network device according to claim 10 further comprising:
    a center tap coupled to the transformer, the center tap configured to separate the power signal from the data signal; and
    the transistor bridge coupled to the center tap of the transformer and configured to regulate the power signal.

13. The network device according to claim 10 wherein:
    the inductance boost circuit is configured to stop functioning during an over-voltage event due to high current saturation of the transformer.

14. A network device comprising:
    an autotransformer coupled to receive input signals from a network connector and supply data signals to a physical layer (PHY) module; and
    an electronic load circuit coupled in parallel between the autotransformer and the PHY layer module;
    the electronic load circuit is operable to provide common-mode output voltage control and a current source to the PHY layer module.

15. The network device according to claim 14 further comprising:
    a first capacitor coupled between a first lead of the autotransformer and the PHY module; and
    a second capacitor coupled between a second lead of the autotransformer and the PHY module.

16. The network device according to claim 14 further comprising:
    a rectifying circuit adapted to conductively couple a network connector to an integrated circuit that rectifies and passes a power signal and data signal received from the network connector.

17. The network device according to claim 16 wherein:
    the rectifying circuit regulates a received power and/or data signal to ensure proper signal polarity is applied to the integrated circuit.

18. The network device according to claim 16 wherein:
    the network connector receives a plurality of twisted pair conductors; and
    any one of a subset of the twisted pair conductors can forward bias to deliver current and the rectifying circuit can forward bias a return current path via a remaining conductor of the subset.

19. The network device according to claim 16 wherein the rectifying circuit includes a power rectifying diode bridge circuit integrated onto the integrated circuit.

20. The network device according to claim 16 wherein the rectifying circuit includes a transistor bridge integrated onto the integrated circuit.

21. A method comprising:
    coupling an inductance boost circuit coupled to a secondary winding of a transformer, wherein a primary winding of the transformer is operable to receive input signals from a network connector and supply data signals to a physical layer (PHY) module, and the inductance boost circuit is configured to stop functioning during an overvoltage event due to high currents saturation of the transformer; and configuring the inductance boost circuit to sense the current through the secondary winding and apply a gain factor to increase the impedance at the primary winding.

22. The method according to claim 21 further comprising:
coupling a first capacitor between a first lead of the transformer and the PHY module; and
coupling a second capacitor between a second lead of the transformer and the PHY module.

23. The method according to claim 21 further comprising:
coupling an electronic load circuit in parallel between the transformer and the PHY layer module.

24. The method according to claim 21 wherein:
the impedance at the primary winding is directly proportional to the frequency of the input signal, the inductance of the primary winding, and inversely proportional to the factor $(1-\alpha)$.

25. The method according to claim 21 further comprising:
coupling a rectifying circuit between a network connector and an integrated circuit that rectifies and passes a power signal received from the network connector.

* * * * *